United States Patent [19]

Silvestrini et al.

[11] Patent Number: 4,768,428
[45] Date of Patent: Sep. 6, 1988

[54] FRUIT GRIPPER HEAD ASSEMBLY

[75] Inventors: Jesus A. Silvestrini; Jose E. Barbier; Juan C. Morsucci, all of Mendoza, Argentina

[73] Assignee: IMDEC S.R.L., Mendoza, Argentina

[21] Appl. No.: 40,986

[22] Filed: Apr. 21, 1987

[30] Foreign Application Priority Data

Apr. 21, 1986 [AR] Argentina ............................. 303721

[51] Int. Cl.⁴ ............................................. A23N 4/22
[52] U.S. Cl. ...................................... 99/551; 99/564; 294/99.1; 294/106
[58] Field of Search ................ 99/547, 551, 552, 564; 294/100, 99.1, 106, 115

[56] References Cited

U.S. PATENT DOCUMENTS 2,664,127 12/1953 Perrelli ................................... 99/551
3,179,137 4/1965 Kilner ............................. 294/106 X
3,353,860 11/1967 Meissner ............................. 294/100

Primary Examiner—Timothy F. Simone
Attorney, Agent, or Firm—Pettis & McDonald

[57] ABSTRACT

A fruit gripper head assembly for use in a machine for pitting fruits of the drupe type includes a support structure receivable onto a pitting machine, a plurality of gripper arms spaced about the central axis of the assembly and mounted on the support structure for pivotal movement toward and away from the central axis, and fluid pressure operated actuating apparatus operatively connected to the gripper arm and to the support structure for urging pivotal movement of the arms toward the central axis upon introduction of pressurized fluid behind that actuating apparatus to provide for pivotal movement of the arms to grip fruit to be pitted.

7 Claims, 1 Drawing Sheet

FRUIT GRIPPER HEAD ASSEMBLY

BACKGROUND OF THE INVENTION

In the canning industry there has long been a requirement for equipment for pitting fruits of the drupe type, such as peaches. To satisfy this requirement, there have been developed various types of equipment for performing such pitting operation in general, this type of apparatus includes two gripper heads, each of which grippingly engages opposing halves of the fruit to be pitted. One type of such apparatus is disclosed in U.S. Pat. No. 4,122,765. While the performance of such prior art apparatus has been satisfactory in many respects, the fruit gripper head assemblies have frequently experienced difficulty in gripping the slightly irregular shapes of the fruit without applying excessive pressure that may cause bruising.

SUMMARY OF THE INVENTION

To overcome the disadvantages of the prior art, it is an object of the present invention to provide an improved fruit gripper head assembly for a pitting machine used to pit peaches and other fruits of the drupe type. It is another object of this invention to provide such an assembly that employs relatively simple mechanical construction that provides for firm gripping of the fruit despite inherent irregularities of the fruit.

Briefly, this invention comprises a fruit gripper head assembly for use in a machine for pitting fruits of the drupe type, which assembly has a central axis that extends through a fruit to be gripped for pitting. The assembly includes support apparatus receivable onto a pitting machine and having an aperture therethrough for communication with a source of pressurized fluid, a plurality of gripper arms spaced about the central axis and radially outwardly therefrom, with each such gripper arm being mounted to the support structure by a pivotal mounting for pivotal movement generally toward and away from the central axis, and fluid pressure operated actuating apparatus operatively connected to the gripper arms and to the support structure for urging pivotal movement of the arms toward the central axis upon introduction of pressurized fluid through the support structure aperture. This actuating apparatus comprises an elastically deformable diaphragm mounted to the support structure to form a fluid-tight chamber in communication with the aperture, such diaphragm having a plurality of portions each engaging one of the gripper arms for actuation thereof.

BRIEF DESCRIPTION OF THE DRAWING

A particularly preferred embodiment of the apparatus of this invention will be disclosed in detail which.

DESCRIPTION OF A PREFERRED EMBODIMENT

Figure 1:
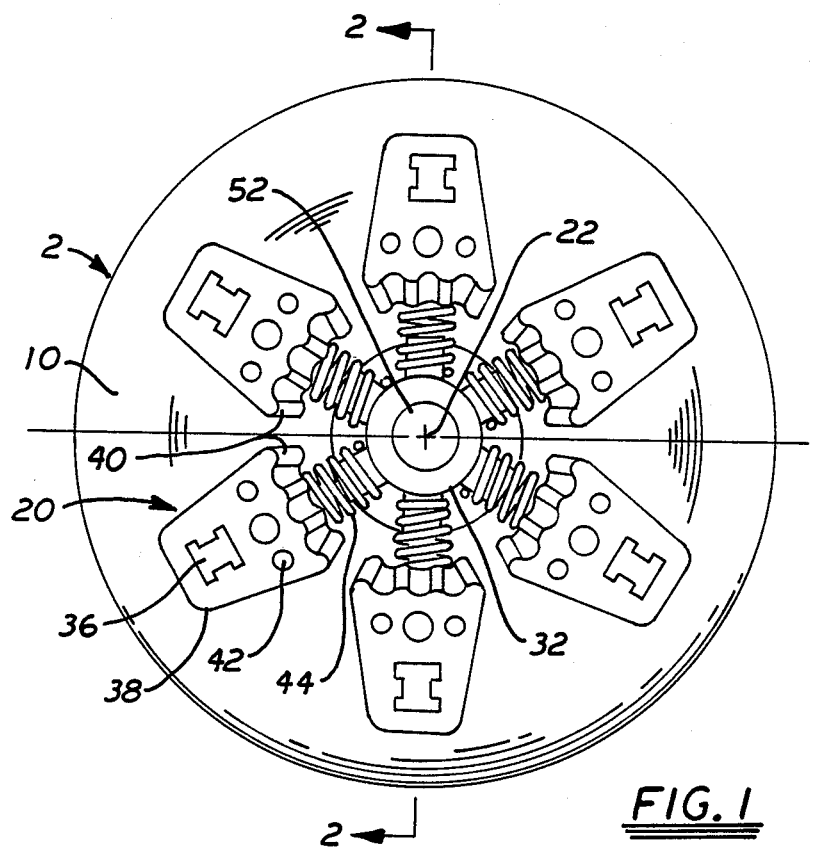
FIG. 1 is an end view of the fruit gripper head assembly of this invention, with the gripper arms in their open, fruit-receiving position.
Figure 2:
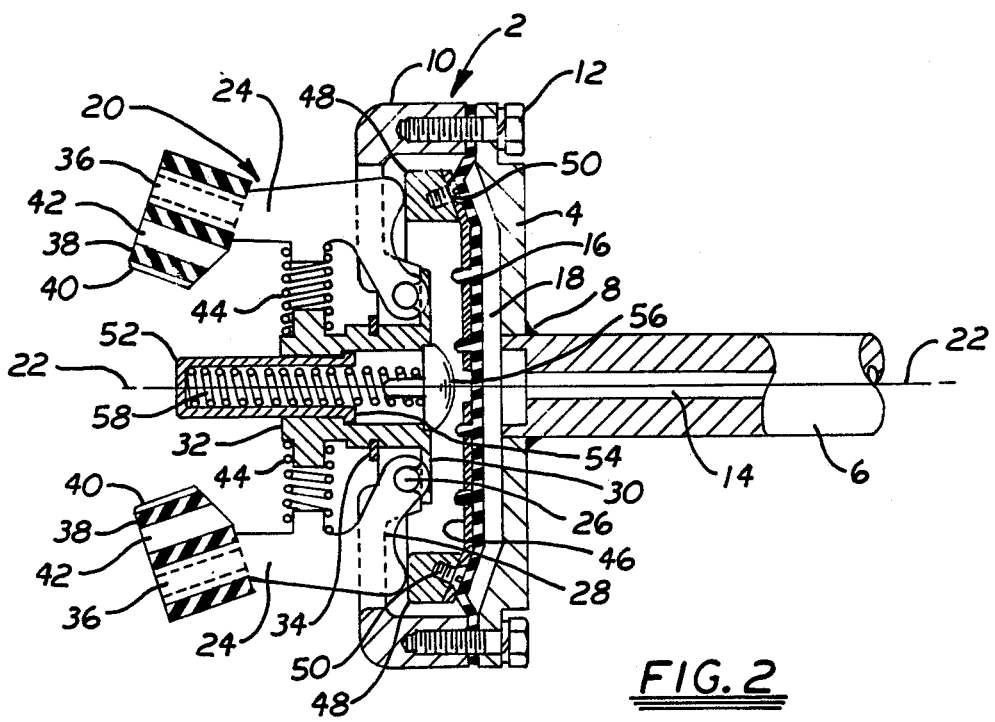
FIG. 2 is a side sectional view of the assembly of FIG. 1 taken along line 2—2.

A particularly preferred embodiment of the fruit gripper head assembly of this invention is illustrated in FIGS. 1 and 2. This apparatus comprises, in general, support means 2 comprises a backing member 4 fixed to a spindle 6 by weldment 8 or by threading or any other convenient means. Affixed to the backing member 4 is a mounting member 10 which, like the backing member 4, conveniently is of circular configuration. The mounting member 10 may suitably be attached to the backing member 4 by a plurality of threaded fasteners 12. The spindle 6, which suitably is in the form of a hollow tube having a fluid passage 14 therethrough, is receivable onto a pitting machine.

Mounted to the support means 2 is an elastically deformable diaphragm 16, which may be formed of any suitable resilient material well known to those skilled in the art. This diaphragm preferably is mounted by clamping interposition between the backing member 4 and the mounting member 10, thus defining a fluid-tight chamber 18 between that diaphragm 16 and the backing member 4. As shown in FIG. 2, that chamber 18 is in communication with the fluid passage 14 within the spindle 6.

Pivotally mounted to the mounting member 10 are a plurality of gripper arms 20. In the preferred embodiment there conveniently are six such gripper arms, as shown in FIG. 1, spaced about the central axis 22 of the gripper head assembly. Because each of the gripper arms 20 is substantially similar to the others, the same reference numbers apply to all. As shown in the figures, in this preferred embodiment the gripper head assembly preferably is substantially symmetrical about this central axis, with the gripper arms spaced radially outwardly therefrom. Each of these gripper arms 20 includes a gripper arm member 24 mounted to the support member 10 by pivotal mounting means, suitably in the form of pivot pin 26 extending through a journal in a first portion 28 of the gripper arm member 24 and being received in a u-shaped journal seat in the mounting member 10. Each such pivot pin 26 is blocked in its journal seat in the mounting member 10 by flange 30 formed on the central hub member 32. This hub member 32 is inserted through a central aperture in the mounting member 10 before the assembly of that mounting member 10 to the backing member 4. After the hub has been inserted in place, capturing each of the pivot pins 26, it may then be held in place by any convenient means, such as snap ring 34, shown in FIG. 2. This pivotal mounting thus provides for pivotal movement of each of the arms generally toward and away from the central axis 22.

On each gripper arm member 24, on a second portion 36 distal the pivotal mounting described above, there is provided a resiliently deformable member 38 affixed to that second portion 36 for resiliently engaging a fruit introduced into the gripper head in a manner to be described below. This resilient member 38 may be formed of a relatively soft synthetic resin and preferably is provided on the portion facing the central axis 22 with a plurality of ribs 40. Additionally, there may be provided one or more passages 42 extending through the resiliently deformable member 38 to increase the resiliency and deformability of that member during gripping engagement.

To urge each of the gripper arms 20 radially outwardly from the central axis 22 to an open position, there are provided resilient biasing means, suitably in the form of compression springs 44 extending from the central hub 32 out to each gripper arm member 24. These resilient biasing means thus urge the gripper arms away from the central axis, as shown in FIGS. 1 and 2.

As shown in FIG. 2, the diaphragm 16 carries a plurality of gripper arm engaging portions, suitably in the form of a substantially rigid sector shaped members 46 mounted on the diaphragm 16. To each of these sector shaped members 46 are affixed substantially rigid pressure caps 48. These pressure caps 48 may be affixed to the sector shaped member 46 by any suitable means, such as by threaded fasteners 50. Each of the pressure caps 48 is formed of a substantially rigid material, such as metal or a rigid synthetic resin, and engages a respective gripper arm member 24, proximal the first portion 28 thereof, for urging the gripper arm toward the central axis 22 in a manner to be described below. Each of the rigid sector members 46 and its associated pressure cap 48 preferably is configured to subtend an arc that underlies its respective gripper arm 20, such that movement of that sector shaped member 46 and its pressure cap 48 will cause movement only of the immediately adjacent gripper arm 20. The diaphragm 16 is formed of a material having sufficient elasticity to provide for such differential deformation of the portions engaging different such gripper arms 20 to provide for differing amounts of movement of the various gripper arms 20 toward the central axis to provide for gripping of fruit of asymmetric shape and differing sizes.

As shown most clearly in FIG. 2, this assembly also includes a plunger 52 mounted for reciprocating movement along the central axis 22 between an extended position, as illustrated, and a compressed position in which the flange 54 is moved axially toward abutting engagement with the plug 56. Conventional resilient biasing means, such as compression spring 58, are provided to urge the plunger 52 toward its extended position.

With the apparatus of this invention described above, a typical mode of operation may now be described. For such operation the apparatus of this gripper head assembly may conveniently be attached to one of several known types of peach pitting apparatus, such as that of U.S. Pat. No. 4,122,765, the teachings of which patent are incorporated herein by reference, although that other apparatus forms no part of the present invention. In such apparatus there conventionally would be provided two opposing such gripper head assemblies, one for gripping each half of the fruit to be pitted. When such a fruit is introduced into the pitting apparatus, each gripper head assembly will be moved to engage the fruit, with such movement being generally in the direction of the central axis 22. As the assembly is brought into engagement with the fruit, the outer surface of that fruit will engage the axially outermost end of plunger 52, thus moving the plunger to its compressed position.

At this time pressurized fluid, conveniently in the form of compressed air, may be introduced through the passage 14 in spindle 6 into the chamber 18 enclosed between backing member 4 and diaphragm 16. Such pressurized fluid will then deform the diaphragm, moving it in a direction generally axially to the left in FIG. 2, thus moving each of the pressure caps 48 likewise to the left. Such movement of these pressure caps 48, contacting the gripper arm members 24, will thus urge movement of the gripper arms 20 pivotally toward the central axis 22. This movement will thus bring resiliently deformable members 38 into engagement with the outer surface of the fruit. Because of the independent pivotal mounting of each arm and the separate sector shaped members 46 supporting each pressure cap 48 to move each arm independently of the other, the elasticity of the diaphragm 16 will permit pivotal movement of each such gripper arm 20 generally independent of the movement of the other such gripper arms. In this manner, the various gripper arms may firmly but resiliently engage the outer surface of the fruit to be pitted with generally uniform pressure being exerted by each of the gripper arms, despite any asymmetry or deformation in the shape of that fruit. In this manner the diaphragm 16 along with the sector shaped members 46 and pressure caps 48 may conveniently comprise an integrated fluid pressure operated actuating mean for urging the desired pivotal movement of the arms toward the central axis.

When the fruit has been so gripped by this gripper head assembly, the remaining steps of a pitting operation may be any of those conventional in the art, such as by differential twisting of the head or by other steps well known to those skilled in the art, which additional pitting steps form no part of the present invention. When the necessary steps have been completed to free the flesh of the fruit from its pit, the pressurized fluid may be exhausted from the chamber 18 behind the diaphragm 16. Upon the release of that pressurized fluid the diaphragm will return to its nonextended position, as illustrated in FIG. 2, thus allowing the resilient biasing means, such as springs 44, to urge the gripper arms 20 to move pivotally away from the central axis 22. When the grip on the fruit has thus been released, the resilient biasing of the plunger 52 will again move that plunger outwardly toward the extended position illustrated in FIG. 2, thus serving to eject the fruit from the gripper head assembly.

While the foregoing has described a particularly preferred embodiment of the gripper head assembly of the present invention, it is to be understood that this description is illustrative only of the principles of the invention and is not to be considered limitative thereof. Because numerous modifications and variations of the disclosed apparatus, all within the scope of the invention, will readily occur to those skilled in the art, the scope of this invention is to be limited solely by the claims appended hereto.

What is claimed is:

1. A fruit gripper head assembly for use in a machine for pitting fruits of the drupe type, said assembly having a central axis that extends through a fruit to a gripped thereby for pitting, said assembly comprising
    support means receivable onto a pitting machine and having an aperture therethrough for communication with a source of pressurized fluid;
    a plurality of gripper arms spaced about said central axis and radially outwardly therefrom with each said gripper arm being mounted to said support means by pivotal mounting means for pivotal movement generally toward and away from said central axis; and
    fluid pressure operated actuating means operatively connected to said gripper arms and to said support means for urging pivotal movement of said arms toward said central axis upon introduction of pressurized fluid through said aperture, said actuating means comprising
    an elastically deformable diaphragm mounted to said support means to form a fluid-tight chamber in communication with said aperture, said diaphragm having a plurality of portions each engaging one of said gripper arms for actuation thereof.

2. The fruit gripper head assembly of claim 1 wherein said support means comprises a backing member affixed to a spindle having a fluid passage extending therethrough, which spindle is receivable onto a pitting machine; and a mounting member affixed to said backing member with said diaphragm interposed between said backing member and said mounting member to form a fluid-tight chamber between said diaphragm and said backing member and in communication with said spindle fluid passage.

3. The gripper head assembly of claim 1 wherein each said diaphragm gripper arm engaging portion comprises a substantially rigid member supported on said diaphragm and positioned to engage one of said gripper arms, whereby introduction of pressurized fluid into said chamber may deform the diaphragm and urge the diaphragm gripper arm engaging portions into actuating engagement with their respective gripper arms to urge pivoting movement of the arms toward the central axis.

4. The gripper head assembly of claim 3 wherein each said gripper arm is mounted to said support means for pivotal movement generally independent of movement of the other said gripper arms, and the elasticity of said diaphragm is sufficient to provide for differential deformation of the portions engaging different said gripper arms, whereby such differential deformation provides for differing amounts of movement of the various gripper arms toward the central axis to provide for gripping of fruit of asymmetric shape and differing sizes.

5. The gripper head assembly of claim 1 further comprising resilient biasing means urging said gripper arms away from said central axis.

6. The gripper head assembly of claim 1 wherein each said gripper arm comprises a first portion proximal said pivotal mounting means, a second portion distal said pivotal mounting means, and a resiliently deformable member affixed to said second portion for resiliently engaging a fruit introduced into said gripper head.

7. The gripper head assembly of claim 1 further comprising a resiliently biased plunger mounted for reciprocating movement along said central axis between an extended position projecting into the space in which a fruit to be pitted is received and a compressed position immediately adjacent said space, whereby introduction of a fruit to be pitted into the gripper assembly will move the plunger to the compressed position and subsequent release of gripping engagement of the fruit will permit the plunger to return to its extended position and to eject the fruit from the assembly.

* * * * *